(12) United States Patent
Teytaud

(10) Patent No.: US 7,587,306 B2
(45) Date of Patent: Sep. 8, 2009

(54) METHOD AND DEVICE FOR A SOURCE LANGUAGE TO BE UNDERSTOOD BY A LISTENER MASTERING A TARGET LANGUAGE

(76) Inventor: François Teytaud, 33 rue Anna Jacquin, 92100 Boulogne Billancourt (FR)

( * ) Notice: Subject to any disclaimer, the term of this patent is extended or adjusted under 35 U.S.C. 154(b) by 470 days.

(21) Appl. No.: 10/503,579

(22) PCT Filed: Feb. 7, 2003

(86) PCT No.: PCT/FR03/00395

§ 371 (c)(1),
(2), (4) Date: Aug. 4, 2004

(87) PCT Pub. No.: WO03/067556

PCT Pub. Date: Aug. 14, 2003

(65) Prior Publication Data

US 2005/0091034 A1  Apr. 28, 2005

(30) Foreign Application Priority Data

Feb. 7, 2002   (FR) .................................. 02 01512

(51) Int. Cl.
*G06F 17/28* (2006.01)
(52) U.S. Cl. ........................ 704/2; 704/3; 704/4; 704/5; 704/6; 704/7; 704/8; 715/264; 434/317; 434/318; 434/319
(58) Field of Classification Search .................. 704/2–8; 715/264; 434/317–319
See application file for complete search history.

(56) References Cited

U.S. PATENT DOCUMENTS

| | | | |
|---|---|---|---|
| 4,328,562 A * | 5/1982 | Hashimoto et al. ............. | 704/3 |
| 4,636,173 A | 1/1987 | Mossman | |
| 5,010,495 A | 4/1991 | Willetts | |
| 5,273,433 A | 12/1993 | Kaminski et al. | |
| 5,387,104 A * | 2/1995 | Corder ........................ | 704/270 |
| 5,393,236 A * | 2/1995 | Blackmer et al. ........... | 434/169 |
| 5,451,163 A | 9/1995 | Black | |
| 5,465,240 A * | 11/1995 | Mankovitz ..................... | 369/1 |
| 5,697,789 A * | 12/1997 | Sameth et al. .............. | 434/157 |
| 5,882,202 A * | 3/1999 | Sameth et al. .............. | 434/157 |

(Continued)

FOREIGN PATENT DOCUMENTS

DE   4013070 A1   10/1991

(Continued)

*Primary Examiner*—David R Hudspeth
*Assistant Examiner*—Lamont M Spooner
(74) *Attorney, Agent, or Firm*—Oblon, Spivak, McClelland, Maier & Neustadt, P.C.

(57) ABSTRACT

The invention concerns a method for source language comprehension designed for a listener mastering a target language, which consists in causing the listener to listen to a statement, consisting of a series of several contents, in the source language and in displaying simultaneously with the listening of the statement a succession of notations marking the succession of contents in the source language, showing a notation marking a content only as from the time when it is being heard and showing, a series of inscriptions in the target language which corresponds to the full statement. The method is characterized in that it consists in showing the whole series of inscriptions before the beginning of the statement.

24 Claims, 2 Drawing Sheets

U.S. PATENT DOCUMENTS

| | | | |
|---|---|---|---|
| 6,341,958 B1 * | 1/2002 | Zilberman | 434/157 |
| 6,370,498 B1 * | 4/2002 | Flores et al. | 704/3 |
| 6,438,515 B1 * | 8/2002 | Crawford et al. | 704/5 |
| 6,999,915 B2 * | 2/2006 | Mestre | 704/2 |
| 7,085,707 B2 * | 8/2006 | Milner | 704/5 |
| 7,155,382 B2 * | 12/2006 | Boys | 704/2 |
| 2002/0069047 A1 * | 6/2002 | Ma et al. | 704/2 |
| 2003/0065503 A1 * | 4/2003 | Agnihotri et al. | 704/7 |
| 2004/0029084 A1 * | 2/2004 | Johnson et al. | 434/169 |
| 2004/0034523 A1 * | 2/2004 | Han | 704/8 |

FOREIGN PATENT DOCUMENTS

| | | |
|---|---|---|
| WO | WO 96/07999 | 3/1996 |
| WO | WO 99/15944 | 4/1999 |

\* cited by examiner

METHOD AND DEVICE FOR A SOURCE LANGUAGE TO BE UNDERSTOOD BY A LISTENER MASTERING A TARGET LANGUAGE

The present invention relates to methods and devices for comprehension of a language, particularly a modern language other than the mother tongue and, in particular, in order to learn it.

It is already known how to understand a foreign language by listening to statements recorded on disks or on cassettes and by following their notation printed in this language and also their translation into the mother tongue in a booklet. When the listener pauses, he finds it very difficult to relocate the statement in the foreign language where he paused, as he has poor mastery of the foreign language he wishes to learn. As the listener necessarily has to pause, the statements he hears, and the notations he reads in the booklet, are subdivided into lessons. Between the lessons, the listener hears statements in the mother tongue enabling him easily to recognize the point in the booklet where he has to restart listening. These statements in the mother tongue are in themselves useless for the purposes of understanding the foreign language and take up space in the statement-emitting device and also in the booklet. Actual understanding of the language is made difficult because the listener has to pay attention not only to the sounds he is hearing and to the notations he is seeing, but also to making a connection between them, since the phonemes and the notations are made to correspond by means of their order of succession. The mental effort required for this connection is to the detriment of the level of attention required to understand the language.

An attempt was made to solve this problem in German patent application 4 013 070 by causing words to be heard, for example in English, and by simultaneously displaying both these English words and their translation into German, simultaneity being marked, for example, by the fact that the word just displayed and its translation appear in bold.

The invention relates to a method and a device that facilitate comprehension of the language, relieving the listener not only of any effort of sequencing that is not strictly necessary for the purpose pursued, but also of a simultaneous-comprehension effort.

The subject of the invention is therefore a method for enabling a source language to be understood by a listener mastering a target language, in which the listener is played a statement consisting of a succession of several contents, in the source language, and is shown, simultaneously with listening to the statement, a succession of notations marking the succession of contents in the source language, showing a notation marking a content only from the moment when it is made possible for it to be heard, and a sequence of inscriptions is shown in the target language corresponding to the meaning of the entire statement, characterized in that the entire series of inscriptions is shown before the beginning of the statement.

By showing the inscription, prior to the start of the statement, the listener is relieved of the comprehension effort to be made at the same time as the listening and notation-following effort. Experience shows that the mind takes precedence over the ear, and that the listener will not truly pay attention to the sound unless his mind is not taken up with seeking the meaning at the time of hearing.

According to a highly preferred embodiment, for good comprehension of the language, the contents are all phonemes. Unlike the German document mentioned above, words without phonic relevance are no longer displayed, but notations corresponding to the phonemes themselves are. One word in the source language, such as "understand", will correspond to three distinct, successive phonemes, such as "un" "der" "stand".

Simultaneity of listening to the phoneme and the notation appearing now enables them to be associated without effort and automatically.

In particular, it is possible to show the notation at the same time as the corresponding phoneme is uttered or to show it before the following phoneme is uttered.

Preferably, the notation marking the phoneme is shown up until the moment when the statement is finished. The listener does not have to follow any reference system, which might, in the meantime, conceal notations. On the screen where the succession of notations is displayed, there is discrimination between the succession of notations that are already apparent and the remainder of the blank line where the following notations will appear. It is also possible to use for this purpose bold-accentuated or color-accentuated writing, an accompanying light beam, a mask that is removed step by step, or another graphic distinction as they appear.

According to one embodiment, simultaneously with the hearing of the succession of phonemes, a series of words in the target language is shown, each word in the series of words in the target language corresponding to a group of phonemes in the source language, a word being shown only from the moment when the first phoneme in the group of phonemes in the source language corresponding to this word is played, one group including one or more phonemes.

Preferably, the succession of notations of the phonemes in a first line is shown superposed over a second line in which the series of words is shown by aligning vertically the first character of each notation of a group of phonemes with the first character of the word corresponding to this group of phonemes, the vertical superposition of the first characters of each phoneme and word greatly lessening the attention effort the listener has to make.

The invention also relates to a device emitting a statement composed of a succession of phonemes, a screen, and means for displaying a succession of notations on the screen, respectively marking the phonemes in the succession of phonemes, means for synchronizing the emitting device and the display means so as to display the notations on the screen only as the phonemes that they mark are emitted.

According to the invention, the display means comprise means for placing a series of inscriptions in the form of a series of electrical translation signals, and the means for placing a series of inscriptions in the form of a series of electrical translation signals are such that the electrical translation signals appear before the first phoneme is emitted.

According to one embodiment that is particularly simple to implement, the emitting device comprises means for placing the succession of phonemes in the form of a phonetic electrical signal train, the display means comprising means for placing the succession of notations in the form of a script electrical signal train, and the synchronizing means synchronizing the phonetic electrical signals and the script electrical signals, this synchronization being effected also in respect of the electrical signals that a person skilled in the art is well able to synchronize.

According to one embodiment, provision is made for means synchronized by emitting device and display means synchronized return synchronization means. The listener may thus immediately listen again to a phoneme and see its notation reappear at the same time (a word, a sentence, a verse, a strophe and/or a paragraph).

Lastly, the invention relates to a display panel including a first line of notations subdivided into groups separated by first intervals, the first line being superposed on a second line of a series of words separated by second intervals, characterized in that the first character in each group is in line with the first character of a word, a first interval has a length different than that of another first interval, and a second interval has a length different than that of another second interval. This panel may be produced in advance and, associated with accentuation means, revealed to the listener at the time of listening or be produced, at the same time as listening takes place, on a screen.

In the appended drawing, given solely by way of example:

Figure 1:
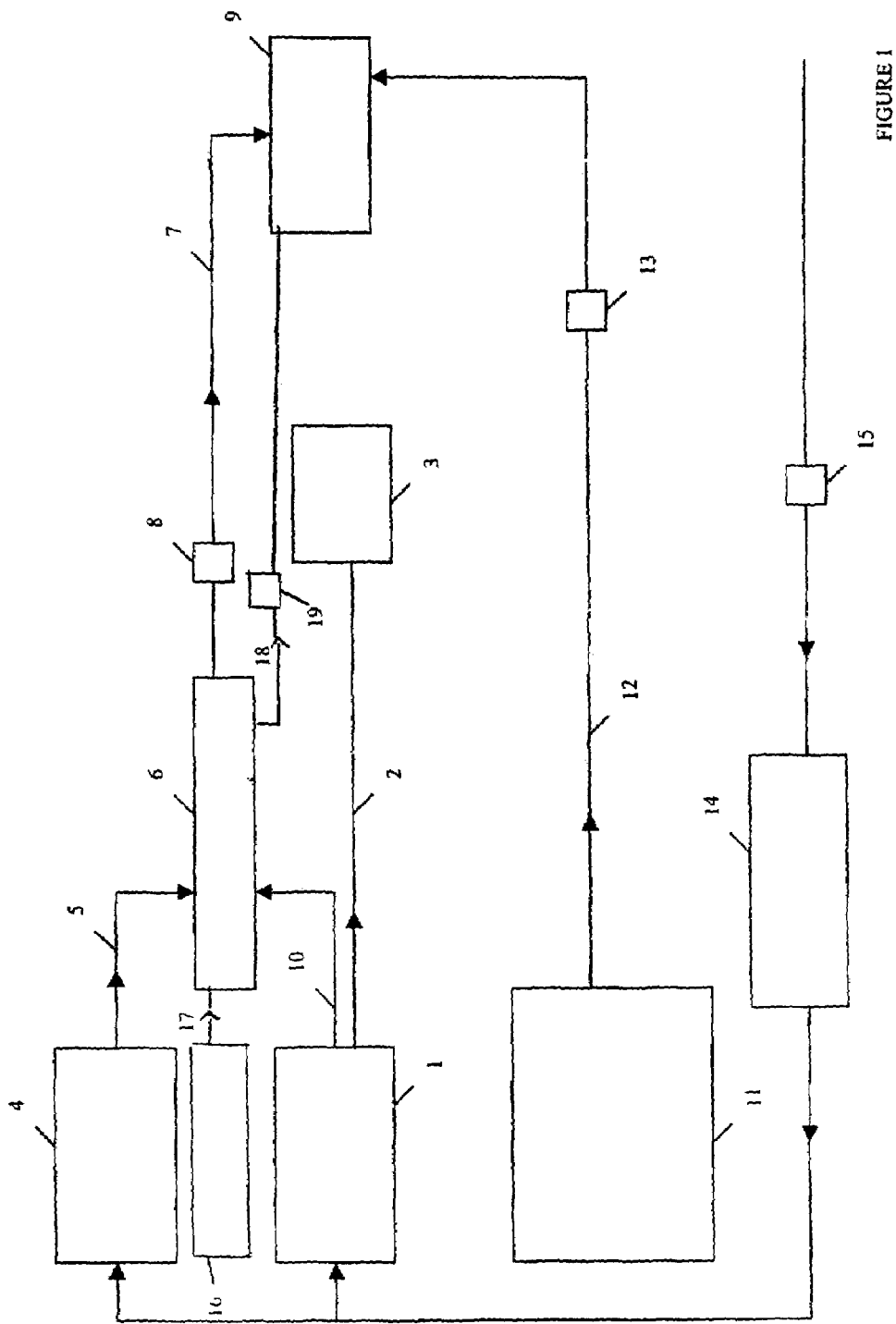
FIG. 1 is a block diagram of a device according to the invention.

The device according to the invention comprises a database 1 in which a statement composed of a succession of phonemes in electrical form is memorized. This database 1 is connected by a line 2 to a loudspeaker 3 in which the phonetic electrical signals from the database 1 are converted into sounds. The device also comprises a database 4 memorizing a succession of notations corresponding to the succession of phonemes and presented in the form of a script electrical signal train conveyed by a line 5 to a synchronizing device 6 that conveys them via a line 7, with interposition of a transducer 8, reconverting the electrical signals into script signals at a screen 9 on which the notations corresponding to the phonemes are displayed. A line 10 connects the database 1 to the synchronizing device 6 such that a notation corresponding to a phoneme appears on the screen 9 only when the phoneme is emitted by the loudspeaker 3.

The device also comprises a database 11 in which translation electrical signals conveyed by a line 12 and, via a transducer 13, to the screen 9 are memorized. However, unlike the signals emitted from the database 4, which appear on the screen only as the corresponding phonemes are heard, the inscriptions corresponding to the translation electrical signals appear at the same time on the screen just before the appearance of the first phoneme of the statement.

Provision is also made for a return device 14 synchronized for the emitting device and for the display means of the script electrical signals controlled by a control unit 15 and arranged such that it causes all or some of the most recent phonemes to be reheard and deletes the corresponding notations that appeared on the screen.

In a database 16, a series of words corresponding to a word-by-word translation of the succession of phonemes is memorized. The electrical signals corresponding to this series are conveyed by a line 17 to the synchronizing device 6, which synchronizes them, first character of one group of phonemes with first character of a word, before conveying them to the screen 9 via a line 18 after passage via a transducer 19.

Figure 2:
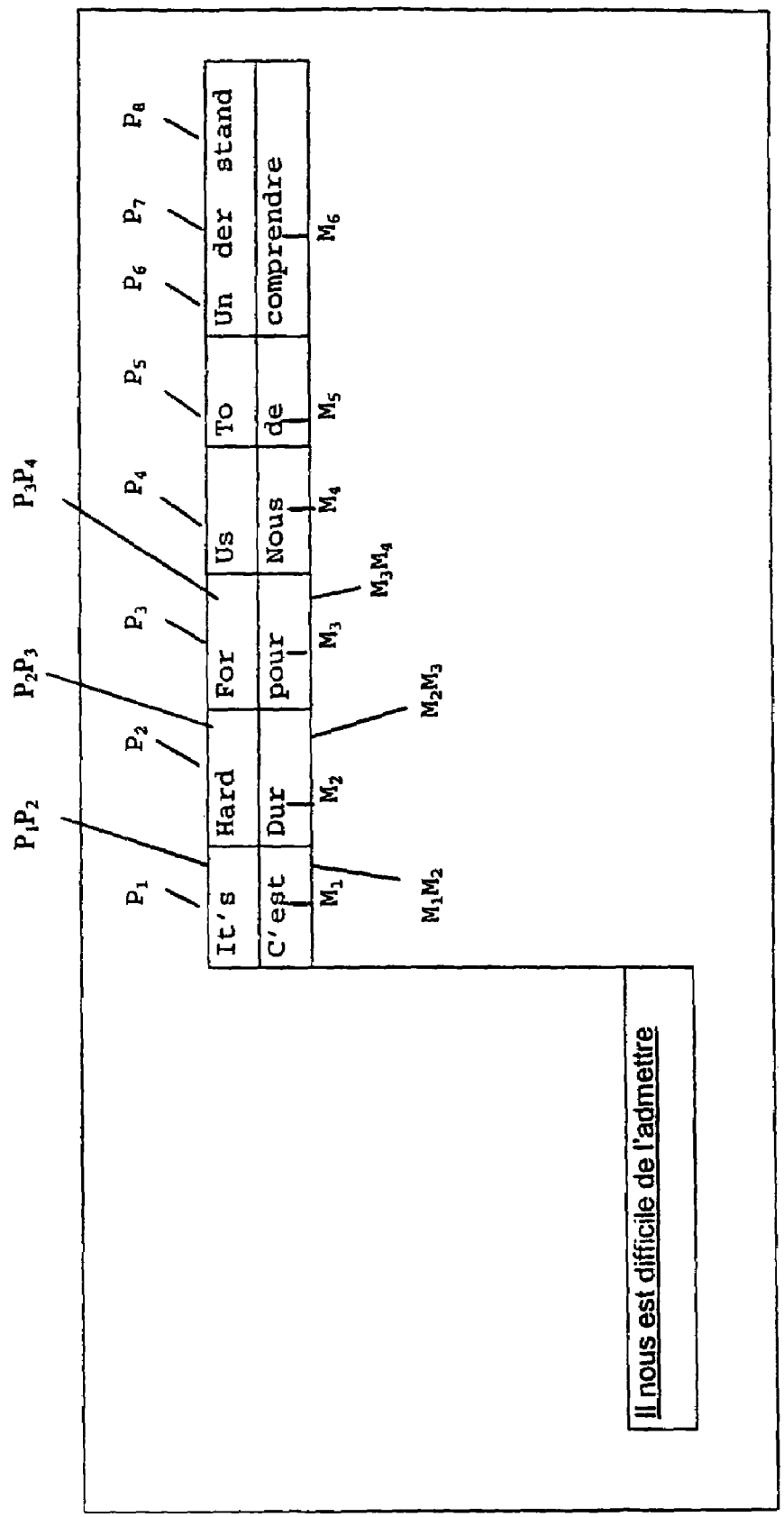
FIG. 2 illustrates the notations and words appearing on the screen of the device.

The time chart in FIG. 2 illustrates the invention. The panel comprises a third line, starting from the top, hence the lowest line, in which a formal translation may be read, namely "It is difficult for us to understand", all of this translation appearing before the two other lines appear on the screen.

The first line, that which is the highest on the screen, notes a succession of phonemes in the source language, in this case English. In the case in point, there are eight phonemes $P_1$ to $P_8$. It will be noted particularly that the word "understand" in English corresponds to the three successive, distinct phonemes $P_6$, $P_7$ and $P_8$. Each phoneme is separated from the phoneme that follows it by an interval denoted, for the interval separating the phoneme $P_1$ and the phoneme $P_2$, "interval $P_1P_2$", for the interval separating the phoneme $P_2$ and the phoneme $P_3$, "interval $P_2P_3$", etc.

In the second line, just below the first line, there is a series of words in the target language, in this case French, each word in the series of words corresponding to a group of phonemes. The word $M_1$ "c'est" corresponds to the phoneme $P_1$, the word $M_2$ "dur" corresponds to the phoneme $P_2$, and so on for the phonemes $P_3$, $P_4$, $P_5$ and the words $M_3$, $M_4$, $M_5$, but the word $M_6$ corresponds to the group of three phonemes $P_6$, $P_7$ and $P_8$.

The intervals between the words are denoted in the same manner as in the first line by $M_1M_2$ for the interval between the word $M_1$ and the word $M_2$, $M_2M_3$ for the interval between the word $M_2$ and the word $M_3$, etc.

The first character of $P_1$, namely I is aligned vertically with the first character of the word $M_1$, namely C. The interval $P_1P_2$ is equal to the interval $M_1M_2$. The first character H of $P_2$ is aligned vertically with the first character D of $M_2$. However, as $M_2$ has one character less than the notation corresponding to the phoneme $P_2$, and as the first character of $P_3$, namely F, is aligned vertically with the first character P of $M_3$, the interval $M_2M_3$ is longer than the interval $M_1M_2$. As the number of characters of the notation of $P_3$ is smaller than the number of characters of the word $M_3$, the notation $P_4$ is offset to a greater extent, and $P_3P_4$ is longer than $P_2P_3$. Certain intervals between the notations are longer than the minimum interval. Certain intervals between the words, for example $P_2P_3$, are longer than the minimum interval.

Alignment takes place in the following manner:

Step 1 Enumeration of the letters and/or signs corresponding to one phoneme or to several phonemes constituting a word in the source language.

The number of these words and/or of these signs constitutes an "Original Value Unit, Line 1" (UVO1).

Step 2 Enumeration of the letters and/or signs corresponding to the words of the target language chosen to represent the "word-by-word" translation of the corresponding words in the source language.

The number of these words and/or of these signs constitutes an "Original Value Unit, Line 2" (UVO2).

Step 3 Joining-up, in the form of binomials, of the UVO1s and UVO2s that correspond.

Step 4 Creation, if appropriate, of "Equivalent Value" (VE) if UVO1# UVO2.

In this case: addition to the smallest value (either UVO1 if <UVO2, or UVO2 if <UVO1) of as much blank space as corresponds to a letter or to a sign as is necessary to create an Equivalent Value, VE, equal to the highest value: (either UVO1 if >UVO2, or UVO2 if >UVO1) such that either UVO1=VE or UVO2=VE.

Illustration:

```
It's      hard      for      us       to       understand
I___I     I___I     I___I    I___I    I___I    I_____I
UVO1      UVO1      UVO1     UVO1     UVO1         UVO1
I___I               I___I    I___I
VE1                 VE1      VE1

C'est     dur       pour     nous     de       comprendre
I___I     I___I     I___I    I___I    I___I    I_____I
UVO2      UVO2      UVO2     UVO2     UVO2         UVO2
          I___I
          VE2
```

Binomial number 1: "It's" and "C'est": UVO1 of "It's"=4, UVO1 of "C'est"=5, hence VE1 of value 5 replaces UVO1.

Binomial number 2: "hard" and "dur": UVO1 of "hard"=4, UVO2 of "dur"=3, hence VE2 of value 4 replaces UVO2.

Binomial number 3: "for" and "pour": UVO1 of "for"=2, UVO2 of "pour"=4, hence VE1 of value 4 replaces UVO1.

Binomial number 4: "us" and "nous": UVO1 of "us"=2, UVO2 of "nous"=4, hence VE1 (of value 4) replaces UVO1.

Binomial number 5: "to" and "de": UVO1 of "to"=2, UVO2 of "de"=2, hence no readjustment.

Binomial number 6: "understand" and "comprendre": UVO1 of "understand"=10, UVO2 of "comprendre"=10, hence no readjustment.

The invention claimed is:

1. A method for enabling a source language to be understood by a listener mastering a target language implemented by a language comprehension device, the method comprising:
    displaying a statement in the target language in its entirety, the statement in the target language including a first set of words that are a formal translation of a statement in the source language;
    audibly reproducing, by the language comprehension device, the statement in the source language as a succession of sounds, after said displaying of the statement in the target language;
    sequentially displaying a succession of markings, the markings are displayed to timely correspond to the successive sounds as audibly reproduced in said audibly reproducing; and
    sequentially displaying a second set of words in the target language, the words in the second set are a word-by-word sequential translation of the statement audibly reproduced, and the words in the second set are displayed to timely correspond to the succession of sounds as audibly reproduced in said audibly reproducing.

2. The method as claimed in claim 1, wherein a marking corresponding to a sound that is currently audibly reproduced is graphically distinguished from other markings that are not audibly reproduced.

3. The method as claimed in claim 1, wherein a succession of the markings in a first line is displayed superposed over a second line in which a series of words is shown by aligning vertically a first character of each text of a group of markings with a first character of the word corresponding to the group of markings.

4. The method as claimed in claim 3, wherein a third line containing the statement in the target language in its entirety is displayed below the first line and the second line, and the third line is displayed before the first and second lines are displayed.

5. The method as claimed in claim 4,
    wherein each word in the target language corresponds to a group of markings in the source language, a word in the second line is only displayed when the first sound in the succession of sounds in the source language corresponding to the word is audibly reproduced, and
    wherein the group of markings includes one or more markings.

6. The method as claimed in claim 4, wherein a word in the target language is only displayed in the second line when a first corresponding sound in the source language is audibly reproduced.

7. The method as claimed in claim 1, wherein a first line of text subdivided into groups is separated by first intervals, the first line being superposed on a second line of a series of words separated by second intervals, a first character in each group is vertically in line with a first character of a word, a first interval has a length different than that of another first interval, and a second interval has a length different than that of another second interval.

8. The method as claimed in claim 1, wherein said markings include letters of a roman alphabet.

9. The method as claimed in claim 1, wherein said sounds are syllables.

10. The method as claimed in claim 1, wherein the first and second set of words are at least in part different.

11. A device, comprising:
    a display configured to display a statement in the target language in its entirety, the statement in the target language including a first set of words that are a formal translation of a statement in the source language;
    an audio reproduction unit configured to audibly reproduce the statement in the source language as a succession of sounds, after displaying of the statement in the target lanauage; and
    the display is further configured to sequentially display a succession of markings, the markings are displayed to timely correspond to the succession of sounds as audibly reproduced, and to sequentially display a second set of words in the target language, the words in the second set are a word-by-word sequential translation of the statement audibly reproduced, and the words in the second set are displayed to timely correspond to the succession of sounds as audibly reproduced.

12. The device as claimed in claim 11, wherein a marking corresponding to a sound that is currently audibly reproduced is graphically distinguished from other sounds that are not audibly reproduced.

13. The device as claimed in claim 11, wherein a succession of the markings in a first line is displayed superposed over a second line in which a series of words is shown by aligning vertically a first character of each text of a group of markings with a first character of the word corresponding to the group of markings.

14. The device as claimed in claim 13, wherein a third line containing the statement in the target language in its entirety is displayed below the first line and the second line, and the third line is displayed before the first and second lines are displayed.

15. The device as claimed in claim 14,
    wherein each word in the target language corresponds to a group of markings in the source language, a word in the second line is only displayed when the first sound in the succession of sounds in the source language corresponding to the word is audibly reproduced, and
    wherein the group of markings includes one or more markings.

16. The method as claimed in claim 14, wherein a word in the target language is only displayed when a first corresponding sound in the source language is audibly reproduced.

17. The device as claimed in claim 11, wherein a first line of text subdivided into groups is separated by first intervals, the first line being superposed on a second line of a series of words separated by second intervals, a first character in each group is vertically in line with a first character of a word, a first interval has a length different than that of another first interval, and a second interval has a length different than that of another second interval.

18. A device, comprising:
    means for displaying a statement in the target language in its entirety, the statement in the target language including a first set of words that are a formal translation of a statement in the source language;
    means for audibly reproducing the statement in the source language as a succession of sounds, after displaying of the statement in the target language; and means for sequentially displaying a succession of markings, the markings are displayed to correspond to the succession of sounds as audibly reproduced, and to sequentially display a second set of words in the target language, the words in the second set are a word-by-word sequential translation of the statement audibly reproduced, and the words in the second set are displayed to timely correspond to the succession of sounds as audibly reproduced.

19. The device as claimed in claim 18, wherein a marking corresponding to a sound that is currently audibly reproduced is graphically distinguished from other markings that are not audibly reproduced.

20. The device as claimed in claim 18, wherein a succession of text of the markings in a first line is shown superposed over a second line in which a series of words is shown by aligning vertically a first character of each text of a group of markings with a first character of the word corresponding to the group of markings.

21. The device as claimed in claim 20, wherein a third line containing the statement in the target language in its entirety is displayed below the first line and the second line, and the third line is displayed before the first and second lines are displayed.

22. The device as claimed in claim 21, wherein each word in the target language corresponds to a group of markings in the source language, a word in the second line is only displayed when the first marking in the succession of markings in the source language corresponding to the word is audibly reproduced, and wherein the group of markings includes one or more markings.

23. The method as claimed in claim 21, wherein a word in the target language is only displayed when a first corresponding sound in the source language is audibly reproduced.

24. The device as claimed in claim 18, wherein a first line of text subdivided into groups is separated by first intervals, the first line being superposed on a second line of a series of words separated by second intervals, a first character in each group is vertically in line with a first character of a word, a first interval has a length different than that of another first interval, and a second interval has a length different than that of another second interval.

* * * * *